(12) United States Patent
Wong et al.

(10) Patent No.: US 9,472,234 B2
(45) Date of Patent: Oct. 18, 2016

(54) HARD DISK DRIVE SPINDLE MOTOR INCLUDING A BASE AND A BASE INSERT FORMED FROM DIFFERENT MATERIALS

(71) Applicant: AGENCY FOR SCIENCE, TECHNOLOGY AND RESEARCH, Connexis, Singapore (SG)

(72) Inventors: Chiew Leong Wong, Singapore (SG); Ke Gan, Singapore (SG); Stephen Ralph Viskochil, Los Gatos, CA (US); Eng Teo Ong, Singapore (SG); Mengjun Liu, Singapore (SG); Ming Chou Lin, Singapore (SG); Wuzhong Lin, Singapore (SG)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/434,691

(22) PCT Filed: Oct. 14, 2013

(86) PCT No.: PCT/SG2013/000438
§ 371 (c)(1),
(2) Date: Apr. 9, 2015

(87) PCT Pub. No.: WO2014/058395
PCT Pub. Date: Apr. 17, 2014

(65) Prior Publication Data
US 2015/0228301 A1 Aug. 13, 2015

Related U.S. Application Data

(60) Provisional application No. 61/712,827, filed on Oct. 12, 2012.

(51) Int. Cl.
*G11B 19/20* (2006.01)
*F16C 41/00* (2006.01)

(52) U.S. Cl.
CPC ......... *G11B 19/2036* (2013.01); *F16C 41/004* (2013.01); *G11B 19/2009* (2013.01); *Y10T 29/49012* (2015.01)

(58) Field of Classification Search
CPC .............. G11B 19/20; G11B 19/2009; G11B 19/2036
USPC ........................... 360/98.07, 99.08; 310/67 R
See application file for complete search history.

(56) References Cited

U.S. PATENT DOCUMENTS 6,921,996 B2  7/2005  Parsoneault et al.
6,949,852 B2  9/2005  Aiello
(Continued)

FOREIGN PATENT DOCUMENTS

WO  WO-03100780 A1  12/2003

OTHER PUBLICATIONS

International Search Report for PCT/SG2013/000438, mailed Jan. 2, 2014; ISA/AU.

*Primary Examiner* — Jefferson Evans (57) ABSTRACT

An axial field motor and a method of assembling the motor are provided. The hard disk drive includes a spindle motor having a fluid dynamic bearing (FDB) motor hub, a hard disk drive housing and a base insert. The hard disk drive housing houses the spindle motor therewithin and has an upper housing and a base, the base including a first material. The base insert has ferromagnetic properties, includes a second material and has a flat circular bottom portion and an outer circumferential vertical portion. The flat circular bottom portion of the base insert is located between the FDB motor hub and the base to enhance yield strength therebetween and a bottom portion of the FDB motor hub is surrounded by the outer circumferential vertical portion of the base insert to generate preload for the FDB motor hub.

15 Claims, 11 Drawing Sheets

(56) References Cited

U.S. PATENT DOCUMENTS

| | | | | |
|---|---|---|---|---|
| 2004/0232782 | A1* | 11/2004 | Xu | G11B 19/2009 310/67 R |
| 2007/0145837 | A1* | 6/2007 | Herndon | F16C 33/745 310/67 R |
| 2012/0033324 | A1* | 2/2012 | Muramatsu | G11B 19/2009 360/99.08 |
| 2013/0335860 | A1* | 12/2013 | Masumi | B22D 19/04 360/99.08 |
| 2013/0342934 | A1* | 12/2013 | Shiraishi | H02K 5/16 360/99.08 |
| 2014/0139949 | A1* | 5/2014 | Kodama | G11B 19/2045 360/99.08 |
| 2015/0062750 | A1* | 3/2015 | Izumi | G11B 19/2009 360/99.08 |
| 2015/0214808 | A1* | 7/2015 | Yang | H02K 5/10 360/99.08 |
| 2015/0262610 | A1* | 9/2015 | Lin | G11B 19/2009 360/99.08 |

* cited by examiner

HARD DISK DRIVE SPINDLE MOTOR INCLUDING A BASE AND A BASE INSERT FORMED FROM DIFFERENT MATERIALS

CROSS-REFERENCE TO RELATED APPLICATIONS

This application is a U.S. National Phase Application under 35 U.S.C. 371 of International Application No. PCT/SG2013/000438 filed on 14 Oct. 2013 and published in English as WO 2014/058395 A1 on 17 Apr. 2014, which claims the benefit of and priority to U.S. Provisional Patent Application No. 61/712,827, filed 12 Oct. 2012. The entire disclosures of the above applications are incorporated herein by reference.

FIELD OF THE INVENTION

The present invention generally relates to hard disk drives and spindle motors for such hard disk drives, and more particularly relates to a low profile spindle motor and a method of assembling a hard disk drive including an axial field spindle motor.

BACKGROUND OF THE DISCLOSURE

Mobile computing and/or communication devices are becoming smaller thereby driving the weight and size of data storage devices down. Thinner structures are generally more susceptible to excessive deformation under a shock scenario. Simply scaling down a typical small form factor hard disk drive to an overall thickness of approximately five millimeters, for instance, would reduce the robustness of the hard disk drive and render it not suitable for use in mobile computing and/or communication devices.

In a typical hard disk drive, the height of the spindle motor can sometimes be the limiting factor that dictates the overall thickness of the hard disk drive. Thus, what is needed is a low profile motor and a method for assembling it onto a platform, such as in the application of mobile hard disk drives. Furthermore, other desirable features and characteristics will become apparent from the subsequent, detailed description and the appended claims, taken in conjunction with the accompanying drawings and this background of the disclosure.

SUMMARY

According to the Detailed Description, a hard disk drive is provided. The hard disk drive includes a spindle motor having a fluid dynamic bearing (FDB) motor hub, a hard disk drive housing and a base insert. The hard disk drive housing houses the spindle motor therewithin and has an upper housing and a base, the base including a first material. The base insert has ferromagnetic properties, includes a second material and has a flat circular bottom portion and an outer circumferential vertical portion. The flat circular bottom portion of the base insert is located between the FDB motor hub and the base to enhance yield strength therebetween and a bottom portion of the FDB motor hub is surrounded by the outer circumferential vertical portion of the base insert to generate preload for the FDB motor hub.

In accordance with another aspect, a method for assembling a hard disk drive is provided. The method for assembling the hard disk drive includes assembling an axial field spindle motor by coupling a top rotor assembly to a bottom rotor through a stator, the top rotor assembly including a fluid dynamic bearing (FDB) motor hub. The method also includes mounting the axial field spindle motor over a base insert, the base insert having a flat circular bottom portion and an outer circumferential vertical portion and the axial spindle motor mounted over the base insert such that the FDB motor hub is located over the circular bottom portion of the base insert and a bottom portion of the FDB motor hub is surrounded by the outer circumferential vertical portion of the base insert.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with the present invention.

FIG. 3, including FIGS. 3A and 3B, illustrates maximum stress distribution plots for different baseplate configurations in accordance with the present embodiment under a 1000 G at one millisecond shock event, wherein

FIG. 10, comprising FIGS. 10A and 10B, depicts side planar views of an initial step of assembling the axial field spindle motor in accordance with the present embodiment, wherein

FIG. 11, comprising FIGS. 11A and 11B, depicts side planar views of a further step of assembling the axial field spindle motor in accordance with the present embodiment, wherein

FIG. 15, comprising FIGS. 15A and 15B, depict views of adhesive placement on the stator in accordance with the present embodiment, where

Skilled artisans will appreciate that elements in the figures are illustrated for simplicity and clarity and have not necessarily been drawn to scale. For example, the dimensions of some of the elements in the figures illustrating integrated circuit architecture may be exaggerated relative to other elements to help to improve understanding of the present and alternate embodiments.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

In low profile or ultra-thin hard disk drives, the geometry and dimension constraints typically lead to large deformation of the motor hub in response to shock events, resulting in correspondingly large deformation of the mounted disk. The present embodiments improve the stiffness of the motor hub and the motor base by (a) adding a base insert to enhance the yield strength, (b) bonding both the magnet top and outer diameter surfaces to the motor hub, and/or (c) integrating the bias ring with the base insert by forming the base insert of a ferromagnetic material. If the material of the base insert is not a ferromagnetic material, a discrete bias ring is utilized to generate preload for the fluid dynamic bearing (FDB). This improved stiffness enables higher shock and impact resistance as well as providing the FDB preload biasing.

Figure 1:
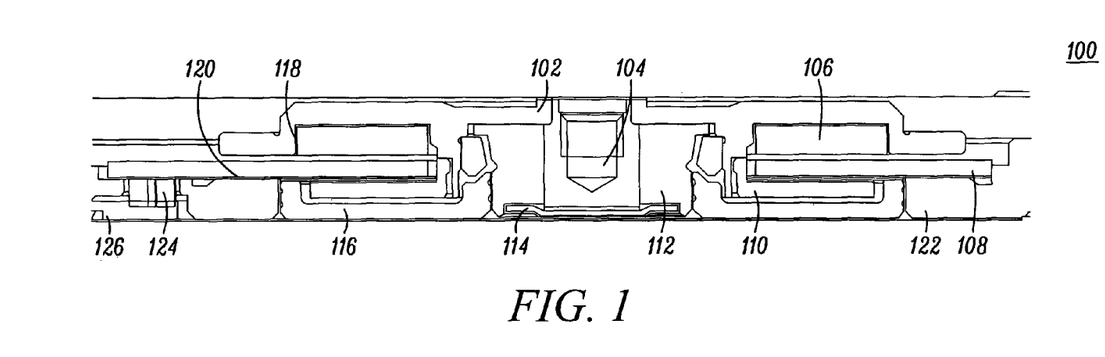
FIG. 1 depicts a side planar cross-section view of a hard disk drive (HDD) including an axial field spindle motor in accordance with a present embodiment.

Referring to FIG. 1, a side planar cross-section view of a hard disk drive (HDD) 100 including an axial field spindle motor in accordance with a present embodiment is depicted. A top rotor assembly includes a top rotor 102 and a fluid dynamic bearing (FDB) motor hub 104 around which the axial field spindle motor pivots. A ring-shaped permanent magnet 106 is connected to the top rotor 102 and a stator 108 is mounted between the top rotor 102 and a bottom rotor 110.

A FDB sleeve 112 is formed around the FDB motor hub 104 and a FDB cap 114 is located below the FDB motor hub 104 such that the FDB sleeve 112 and the FDB cap 114 form a fluid receptacle for the fluid dynamic bearing as a bottom portion of the FDB motor hub 104. A base insert 116 has ferromagnetic properties and has a flat circular bottom portion with a center hole and an outer circumferential vertical portion. The FDB sleeve 112 fits within the center hole of the base insert 116 and the bottom rotor 110 sits above the base insert 116 and is surrounded by the outer circumferential vertical portion of the base insert 116 so that the base insert 116 with its ferromagnetic properties generates preload for the FDB motor hub 104.

To increase stiffness of the hard disk drive 100, the permanent magnet 106 is bonded to the top rotor assembly by adhesive 118. The adhesive 118 is applied to a top surface and an outer diameter side surface of the permanent magnet 106 to bond the top surface of the permanent magnet 106 to a bottom surface of the top rotor 102 and bond the outer diameter side surface of the permanent magnet 106 to a complementary underside surface of the top rotor 102. In addition, an adhesive 120 is applied to a bottom surface of a portion of the stator 108 which extends out from between the top rotor 102 and the bottom rotor 110 to adhere such bottom surfaces of the stator 108 to adjoining top surfaces of a bottom housing or base 122 to provide adhesion and environmental sealing. Also, the flat circular bottom portion of the base insert 116 is located between the FDB motor hub 104 and the base 122 to enhance yield strength therebetween.

An elastomeric connector 124 connects multiple leads on the stator 108 to a printed circuit board (PCB) assembly 126. Thus, it can be seen that the hard disk drive 100 uses the improved axial field motor design with a high yield stress metal base insert 116. The base insert 116 sits within a center depression of the base 122 surrounding the FDB motor hub 104. The base insert 116 is made of a second material having a higher yield strength than a first material of the surrounding base 122. For example, while the base 122 is typically die cast aluminum, the base insert could be formed of stronger aluminum (i.e., thicker and/or non-die cast aluminum) or steel. In the hard disk drive 100, the stator 108, the axial field spindle motor top rotor 102, the bottom rotor 110, the FDB motor hub 104, and the permanent magnet 108 are shown, while a disk media, disk clamps and a HDD cover are not shown.

Figure 2:
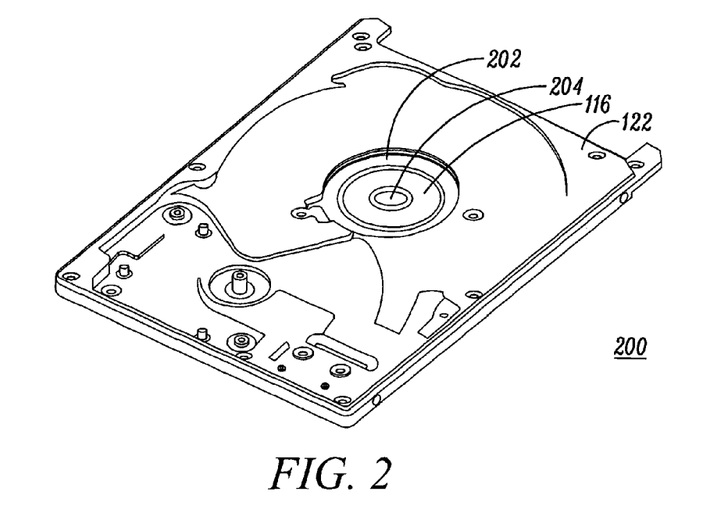
FIG. 2 depicts a front top right perspective view of a base of an HDD housing for the axial field motor of FIG. 1, the HDD housing base including a base insert in accordance with the present embodiment.

FIG. 2 depicts a front top right perspective view 200 of the base 122 bottom housing for the hard disk drive 100 in accordance with the present embodiment. The base 122 may also be called a baseplate. As shown in the view 200, the base insert 116 is set into a recess 202 in the base 122. The center hole (a hole 204) in the base insert 116 is for the FDB motor hub 104 and, thus, the FDB sleeve 112 sits within the hole 204.

Figure 3A:
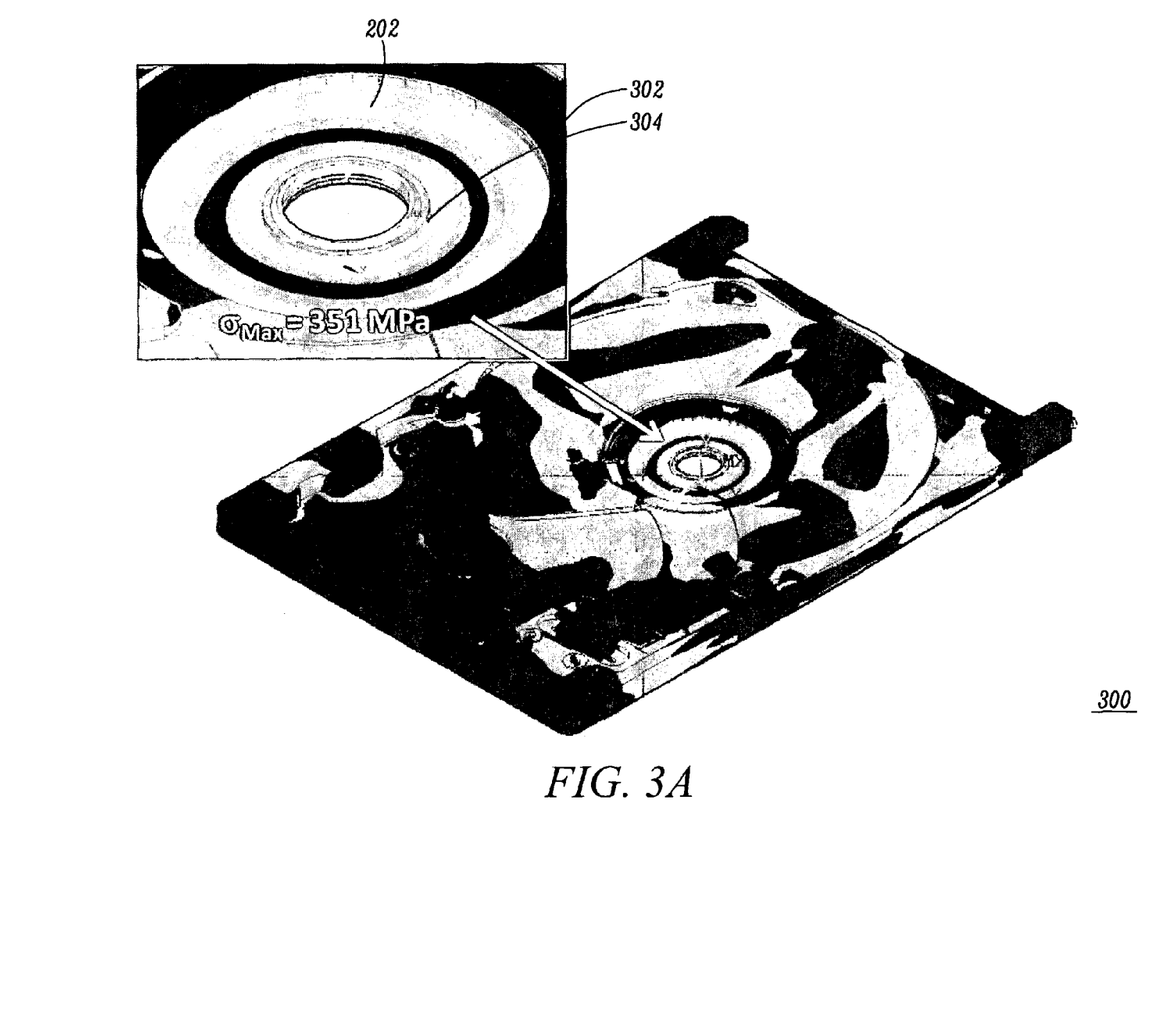
FIG. 3A is a maximum stress distribution plots for an aluminum baseplate and FIG. 3B is a maximum stress distribution plots for a stainless steel baseplate.
Figure 3B:
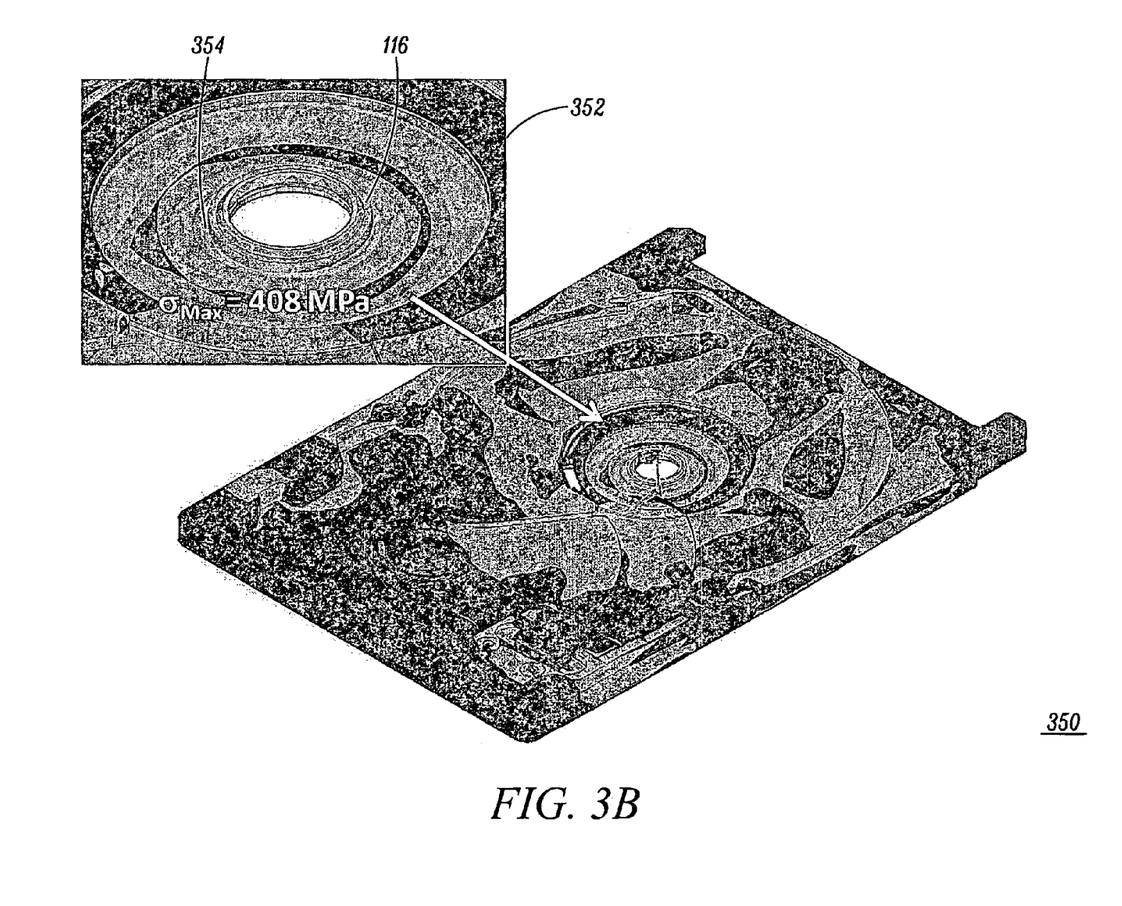

FIG. 3, including FIGS. 3A and 3B, illustrates maximum stress distribution plots for different baseplate configurations in accordance with the present embodiment under a 1000 G at one millisecond non-operation shock event. Referring to FIG. 3A, a maximum stress distribution plot 300 depicts the case where the baseplate is made entirely of cast aluminium alloy (Al 383), with a yield strength $\sigma_y=150$ MPa. Analysis of the distribution plot 300 reveals that material near the FDB mounting region (i.e., the recess 202 as seen more clearly in insert 302) has a maximum stress of 351 MPa in the region 304, hence is highly susceptible to suffering permanent plastic deformation during the high G-shock event. This is undesirable because it may lead to misalignments among the various hard disk drive components, such as the disk and its load/unload ramp spacing, which in turn may affect the normal load/unload operations. On the other hand, FIG. 3B shows a maximum stress distribution plot 350 for the case where a stainless steel alloy base insert 116 is used as the FDB housing within the recess 202. Typical yield strength of stainless steel alloy, such as 420 stainless steel, is greater than 500 MPa. The recess 202 with the base insert. 116 (as seen more clearly in insert 352) has a maximum stress of only 408 MPa in the region 354. Thus, in this case, it is unlikely that the material will deform plastically during the high G-shock event, thereby preventing misalignment problems as discussed hereinabove.

Figure 4:
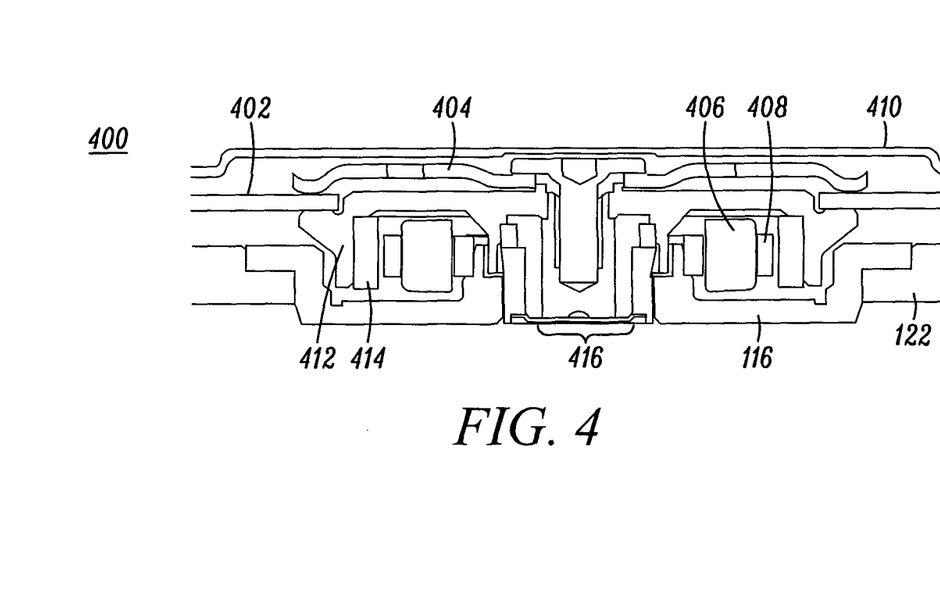
FIG. 4 depicts a side planar cross-section view of a hard disk drive (HDD) including a radial field motor using aspects of the present innovative design in accordance with the present embodiment.

FIG. 4 depicts a side planar cross-section view 400 of a hard disk drive (HDD) including a radial field motor using aspects of the present innovative design in accordance with the present embodiment. While the innovative design discussed hereinabove in reference to FIG. 1 provides an advantageous design for an axial field spindle motor, the base insert 116 can also be used to provide similar advantages to a radial field motor. Disk media 402 is coupled to the radial field motor by disk clamps 404. The radial field motor includes, as those skilled in the art will understand, armature windings 406, stator cores 408, a radial motor rotor hub 412, a permanent ring magnet 414 and a fluid dynamic bearing assembly 416. The HDD housing includes the base 122 (having the base insert 116 mounted therein) and a HDD cover 410. The base insert 116 allows easier assembly of the radial field motor and increased shock absorption capability of the motor and hard disk drive.

Figure 5:
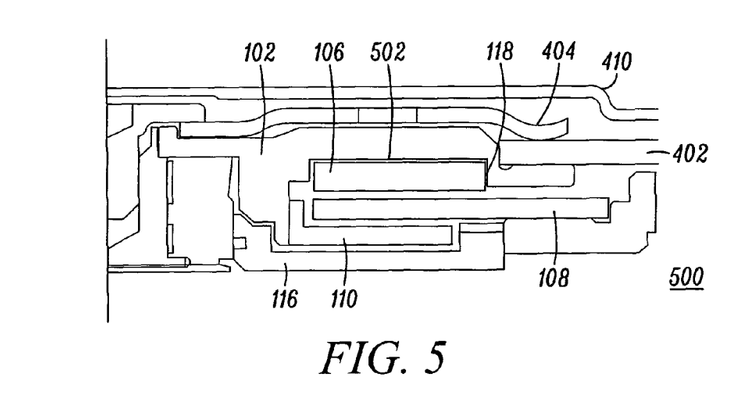
FIG. 5 depicts a side planar cross-section view of the right half of the HDD of FIG. 1 highlighting the magnet surfaces bonded to the motor hub in accordance with the present embodiment.

FIG. 5 depicts a side planar cross-section view 500 of the right half of the hard disk drive 100 in accordance with the present embodiment highlighting increased shock absorption capabilities of the axial field spindle motor assembly in accordance with the present embodiment. The permanent magnet 106 is mounted above the stator 108 for axial field generation to enable operation of the axial field spindle motor. For increased stability, during assembly both the top and the outer diameter surfaces of the permanent magnet 106 are bonded by an adhesive 502, 118 to the top rotor 102.

Figure 6:
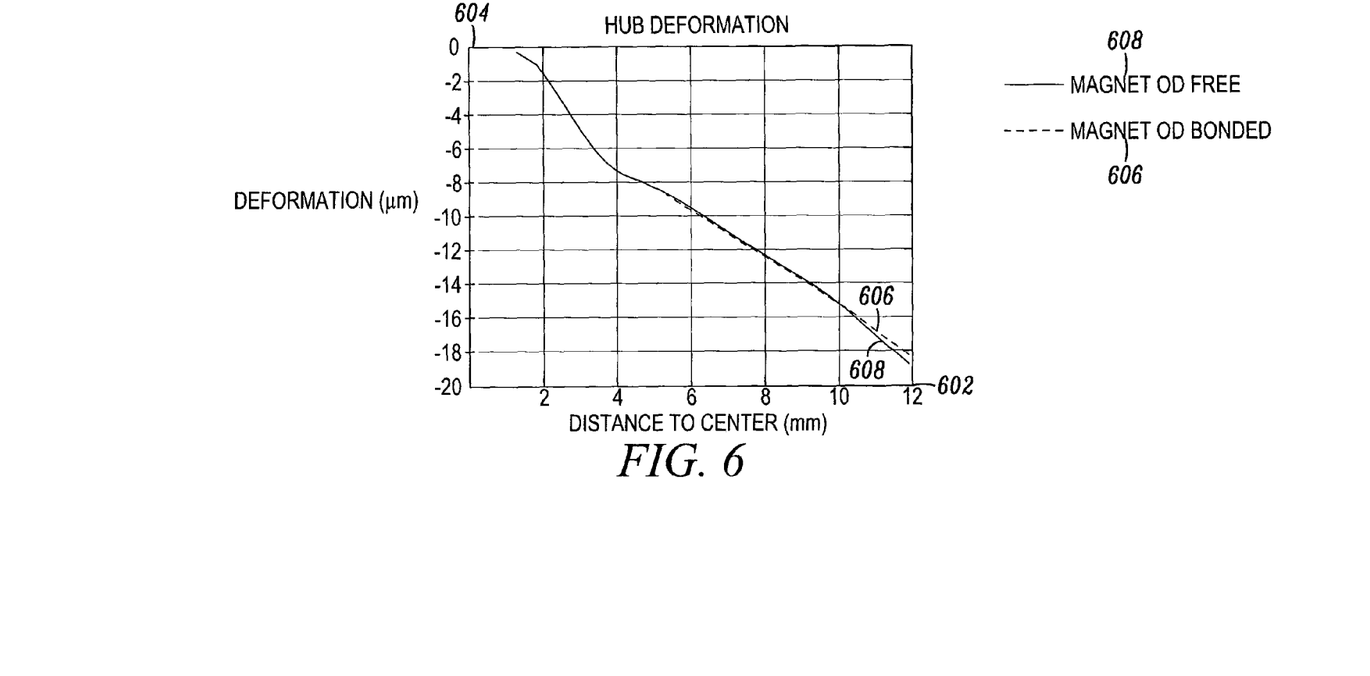
FIG. 6 illustrates a graph of improved hub deformation under a clamping load when the magnet surfaces are bonded onto the hub of the HDD of FIG. 5 in accordance with the present embodiment.

FIG. 6 illustrates a graph 600 of improved hub deformation under a clamping load when the magnet surfaces are bonded onto the hub of the hard disk drive 100 in accordance with the present embodiment. Along an x-axis 602, the distance from the center is plotted and along a y-axis 604 deformation at those distances is plotted. The dotted line trace 606 shows deformation when the magnet 106 is bonded, while the solid line trace 608 shows deformation when the magnet 106 is not bonded. As can be seen from the graph 600, the present embodiment lessens deformation towards the outer diameter of the motor assembly.

Figure 7:
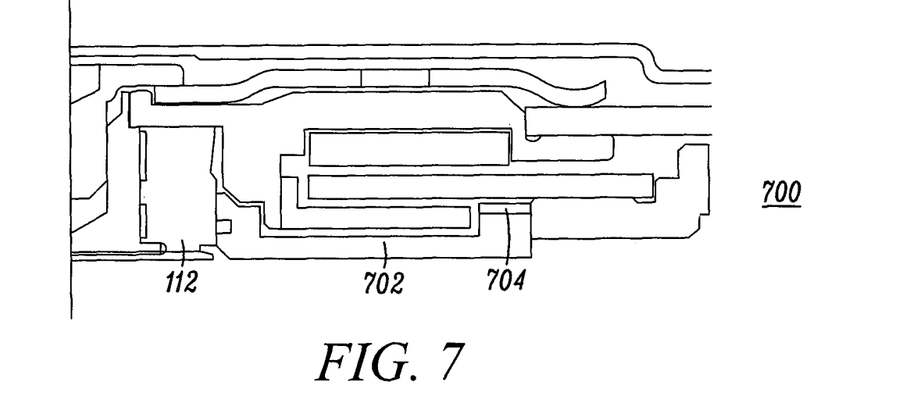
FIG. 7 depicts a side planar cross-section view of the axial field spindle motor of FIG. 1 wherein, in accordance with one aspect of the present embodiment, a magnetic bias ring is included at the outer rim of the base insert when the base insert is made of non-ferromagnetic material.

FIG. 7 depicts a side planar cross-section view 700 of the axial field spindle motor of FIG. 1 wherein, in accordance with one aspect of the present embodiment, a magnetic bias ring 704 is included at the outer rim of a base insert 702 when the base insert 702 is made of non-ferromagnetic material in order to provide ferromagnetic properties thereto. Thus, the base insert 702 has a magnetic bias ring 704 mounted on it because the base insert 702 is not formed of a ferromagnetic material.

The base insert 702, 116, by both its design and location, provides additional support and resiliency to the motor assembly. This improves the shock absorption capabilities of the hard disk drive 100, particularly of the motor assembly. This also allows the hard disk drive 100, and in particular the fluid dynamic bearing of the FDB motor hub and the disk media, to minimize deformation during an impact event such as when the hard disk drive is dropped or roughly shaken. Those skilled in the art will realize that minimization of deformation during such impact events improves product lifetime and ensures continued high performance disk operation. During typical operation, the hard disk drive 100 is required to locate and read information within very narrow tolerances, particularly as disk media is moving towards one terabyte per square inch storage requirements. Minimization of deformation during impact events in accordance with the present embodiment enables the hard disk drive 100 to maintain those very narrow tolerances.

Figure 8:
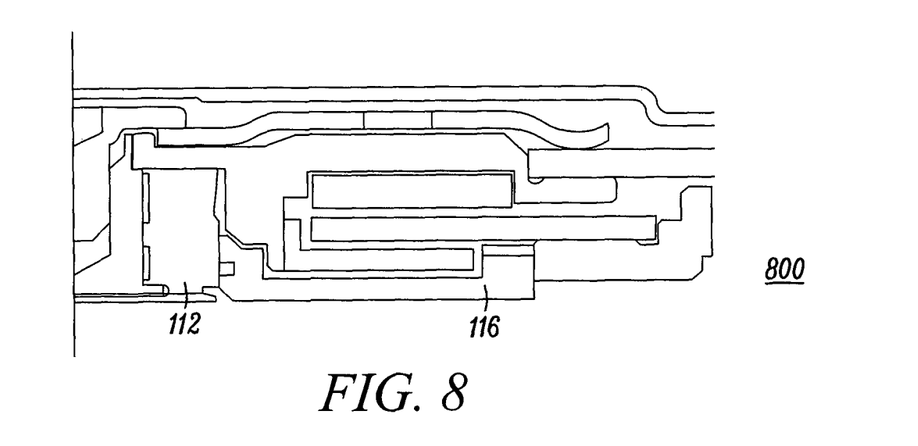
FIG. 8 depicts a side planar cross-section view of the axial field spindle motor of FIG. 1 wherein the base insert is ferromagnetic in accordance with another aspect of the present embodiment.

FIG. 8 depicts a side planar cross-section view 800 of the axial field spindle motor of the hard disk drive 100 wherein the base insert 116 is ferromagnetic in accordance with another aspect of the present embodiment. The base insert 116 has ferromagnetic properties itself, replacing a need for the magnetic bias ring 704 mounted on base insert 702 (FIG. 7). In other words, a bias ring is integrated with the base insert 116 because the base insert 116 is itself formed of ferromagnetic material. Thus, in accordance with the present embodiment, an additional part can be removed, providing more stability and resiliency to the motor assembly, thereby increasing the shock absorption capability of the assembly and of the whole hard disk drive 100. The ferromagnetic base insert 116 also allows improved ease of assembly as it provides a bias load for assembly without any extra alignment of a bias ring, i.e., self-alignment of bias ring capability. For preload matching of the base insert 116 to the permanent magnet 106 for proper biasing, base insert 116 and permanent magnet 106 parameters can be adjusted. These parameters may include the radius of the base insert 116, the radial separation of the base insert 116, the surface height of the base insert 116, and the thickness of the permanent magnet 106. Advantageously, the ferromagnetic base insert 116 simultaneously addresses another issue faced by thin, low profile motors by providing a preload to the fluid dynamic bearings, by means of magnetic attraction between the permanent magnet 106 and the base insert 116. Those skilled in the art will realize that preloading the spindle motor in a hard disk drive requires adequate application of force and accurate alignment of parts.

Figure 9:
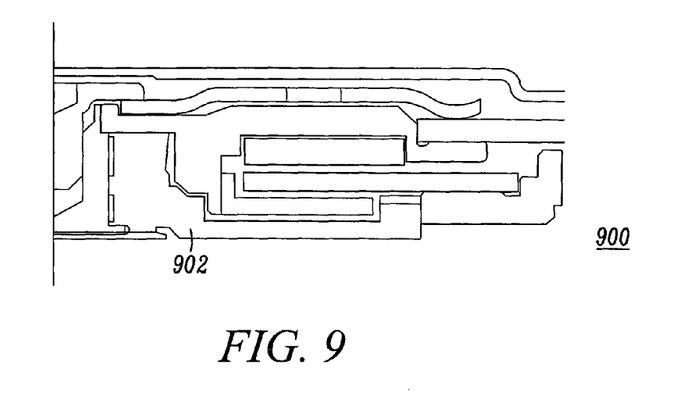
FIG. 9 depicts a side planar cross-section view of the axial field spindle motor in accordance with the present embodiment wherein the fluid dynamic bearing (FDB) sleeve is integrated into the base insert.

FIG. 9 depicts a side planar cross-section view 900 of the axial field spindle motor in accordance with the present embodiment wherein the FDB sleeve 112 is integrated into the base insert 116, together identified in the view 900 as integral part 902, thereby removing an extra part and further increasing the stability shock absorbing capability of the assembly. The FDB sleeve 112 (FIG. 1) allows free rotation of the FDB assembly within the center portion of the motor assembly. Integration of this sleeve with the base insert into the integral part 902 allows improved seating of the base insert in the base housing (see FIG. 2), as well as easier assembly of the motor assembly and increased shock absorption capability of the motor assembly.

FIGS. 10-17 show improved assembly of the axial motor assembly in accordance with the present embodiment. FIGS. 10A and 10B depict side planar views of an initial step 1000 of assembling the axial field spindle motor in accordance with the present embodiment. Referring to FIG. 10A, the top rotor assembly 1002, the stator assembly 1004, and the bottom rotor assembly 1006 are depicted before assembly, the top rotor assembly 1002 including the top rotor 102 and the fluid dynamic bearing (FDB) motor hub 104.

Figure 10A:
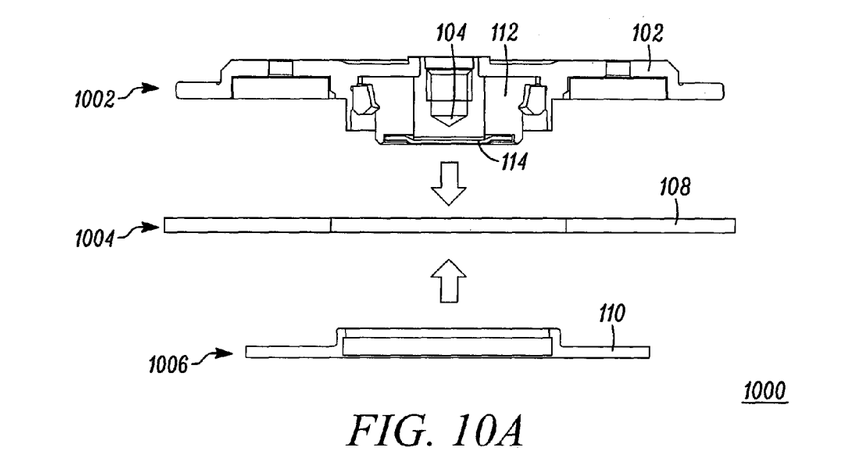
FIG. 10A depicts the stator, the top rotor and bottom rotor before assembly
Figure 10B:
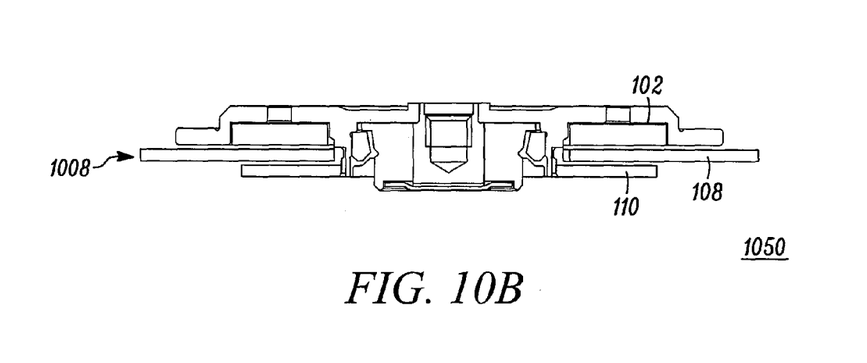
FIG. 10B depicts the stator, the top rotor and bottom rotor after assembly.

The axial spindle motor 1008 is assembled by coupling the top rotor assembly 1002 to the bottom rotor assembly 1006 through the stator as shown in FIG. 10A and indicated by the arrows therein. FIG. 10B depicts the axial spindle motor 1008 after assembly with the bottom rotor 110 assembled to the top rotor 102 and the FDB motor hub 104 with the stator 108 floating therebetween.

Figure 11A:
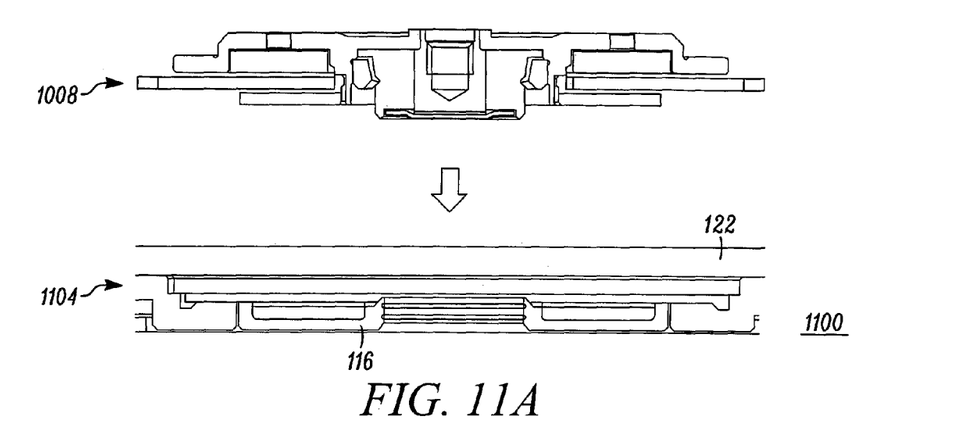
FIG. 11A depicts the stator/top rotor/bottom rotor assembly and a bottom housing with a base insert before assembly and FIG. 11B depicts the stator/top rotor/bottom rotor assembly and the bottom housing/base insert after assembly.
Figure 11B:
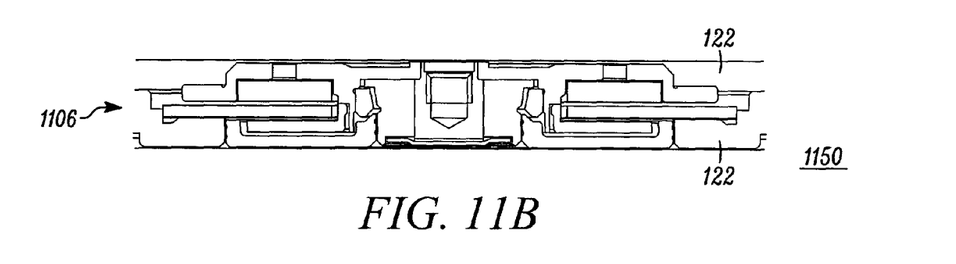

FIG. 11, comprising FIGS. 11A and 11B, depicts side planar views of a further step 1100, 1150 of assembling the axial field spindle motor in accordance with the present embodiment. FIG. 11A depicts the stator/top rotor/bottom rotor assembly 1008 and a bottom housing/base insert 1104 before mounting and FIG. 11B depicts the stator/top rotor/bottom rotor and the bottom housing/base insert assembly 1106 after mounting. In assemblies 1104, 1106, the base insert 116 is a ferromagnetic base insert which also functions as the motor preload source via magnetic attraction to preload bias the permanent magnet 106.

Figure 12:
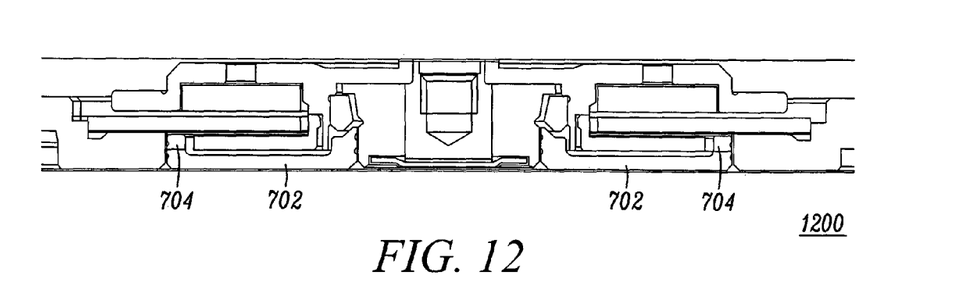
FIG. 12 depicts a side planar view of the assembly of FIG. 11B in accordance with the present embodiment where a discrete bias ring is used with a non-ferromagnetic base insert.

FIG. 12 depicts a side planar view 1200 of the assembly 1106 of FIG. 11B in accordance with the present embodiment where a discrete ferromagnetic bias ring 704 is used with a non-ferromagnetic base insert 702 instead of the ferromagnetic base insert 116. For example, the base insert 702 may be steel to provide additional support while the discrete bias ring 704 provides the ferromagnetic properties and is attached to a top surface of the outer circumferential vertical portion of the base insert 702 for preload biasing.

Figure 13:
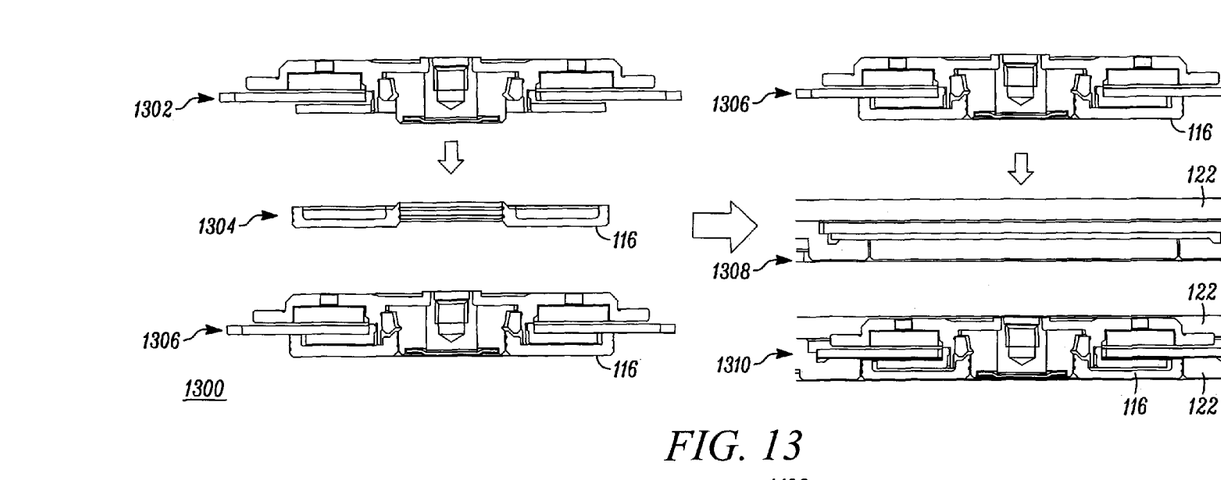
FIG. 13 depicts side planar views of alternative assembly steps to FIG. 11 in accordance with the present embodiment where the stator/top rotor/bottom rotor assembly is first assembled to the base insert and then that combination assembly is assembled with the bottom housing.

FIG. 13 depicts side planar views of alternative assembly steps to FIG. 11 in accordance with the present embodiment where the stator/top rotor/bottom rotor assembly 1302 is first assembled to the base insert assembly 1304 and then that combination assembly 1306 is assembled with the bottom housing assembly 1308 to form the assembly 1310 (similar to 1106).

Figure 14:
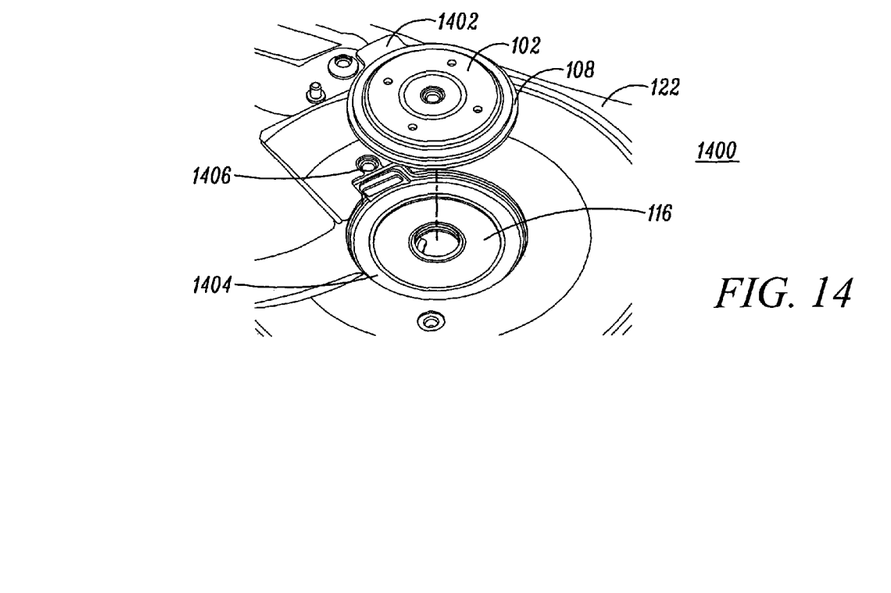
FIG. 14 depicts a rear top right perspective view of the assembly step of FIG. 11A in accordance with the present embodiment.

FIGS. 14 and 15 show the improvement of attaching the stator 108 firmly to the base 122. FIG. 14 depicts a rear top right perspective view 1400 of the assembly step of FIG. 11A in accordance with the present embodiment. In the view 1400, it can be seen that the stator 108 includes a stator tab 1402 and an outer circumferential edge or outer profile which extends out from or outside the axial spindle motor assembly. The base insert 116 sits within a depression 1404 in the housing base 122. The stator tab 1402 aids in orientation and alignment during assembly by aligning the stator tab 1402 with a receiving depression 1406 in the housing base 122. The stator tab 1402 also enables electrical coupling of the stator 108 to the PCB assembly 126 (FIG. 1) as multiple electrical leads from the stator 108 are on the stator tab 1402 and the stator tab 1402 physically couples to the elastomeric connector 124 and the multiple leads electrically couples to the elastomeric connector 124.

Figure 15A:
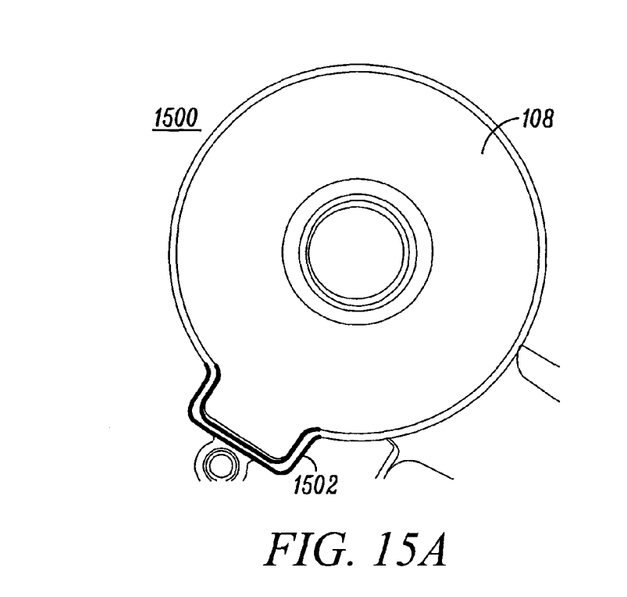
FIG. 15A is a top planar view of the stator illustrating adhesive placement on top of the stator tab and FIG. 15B is a rear top right perspective view illustrating adhesive placement on the bottom of the stator and the stator tab.
Figure 15B:
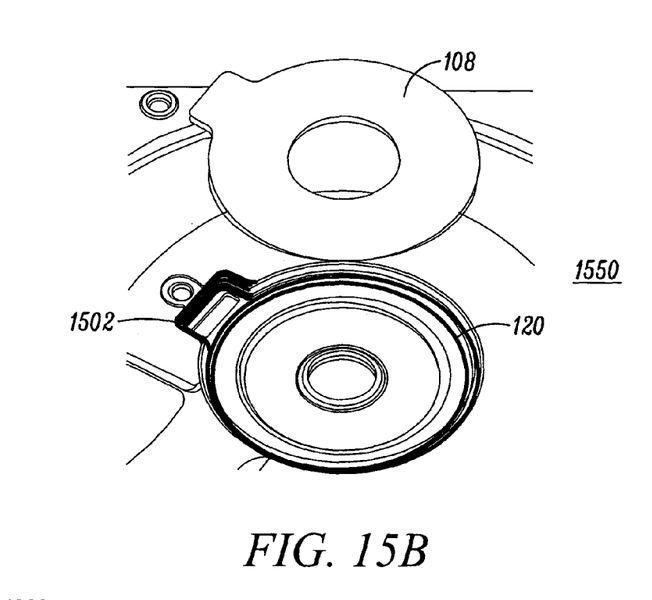

FIGS. 15A and 15B depict views of adhesive placement on the stator 108 in accordance with the present embodiment. FIG. 15A is a top planar view 1500 of the stator illustrating placement of an adhesive 1502 on a top surface of the stator tab 1402 and FIG. 15B is a rear top right perspective view 1550 illustrating placement of the adhesive 1502 on the bottom of the stator 108 and the stator tab 1402. By applying the adhesive 1502 to the stator tab 1402 and the outer diameter of the stator 108 and adhering the stator 108 to the base 122 as shown in FIGS. 14 and 15, shock absorption capability of the whole assembly (i.e., the motor assembly and the HDD assembly) is improved. In addition, sealing of the motor from the drive exterior is realized. The adhesive 1502 could be any suitable adhesive such as a high strength adhesive, an epoxy adhesive, a quick cure adhesive or an ultraviolet-curable adhesive.

Figure 16:
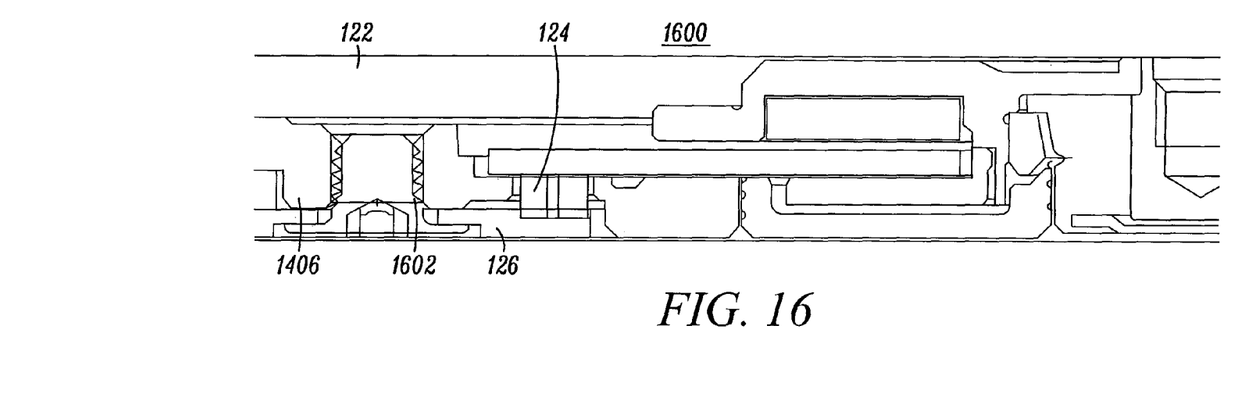
FIG. 16 depicts a more detailed side planar cutaway view of FIG. 11B in accordance with the present embodiment where an elastomeric connector is depicted connecting the PCB assembly to the motor.
Figure 17:
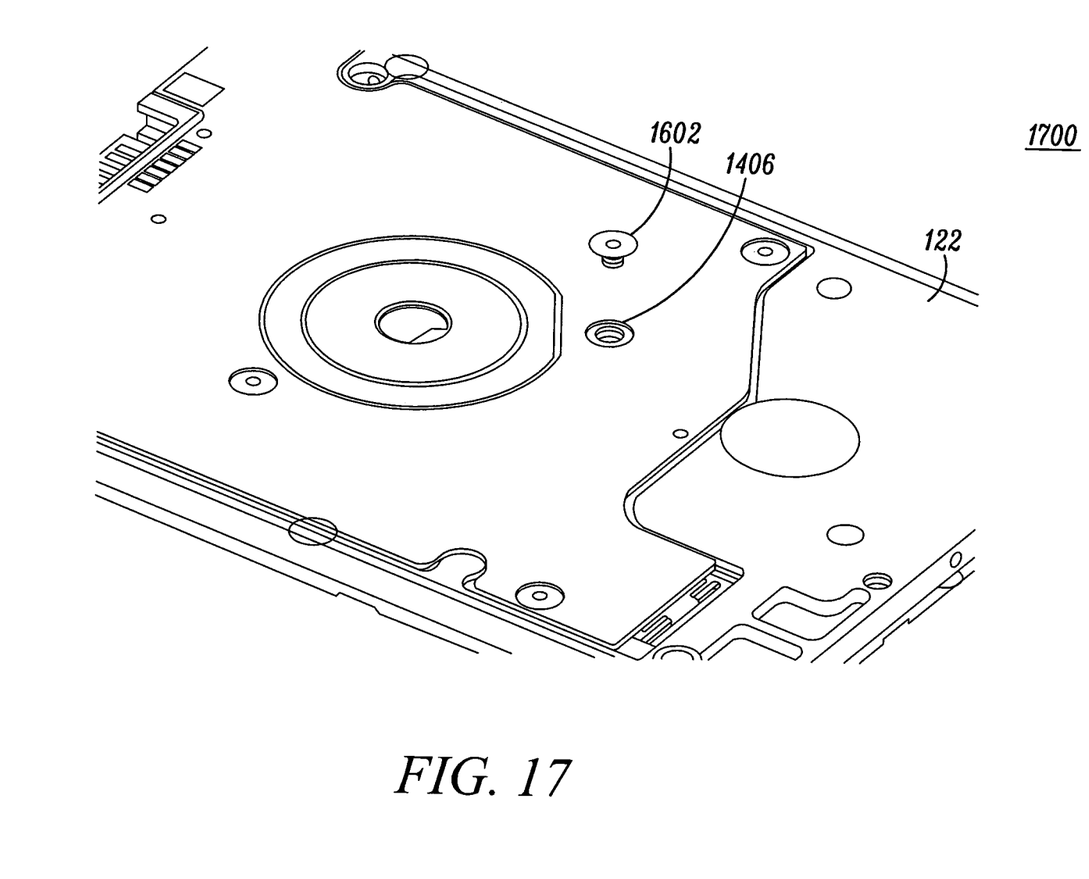
FIG. 17 depicts a front bottom right perspective view of a bottom of the HDD housing illustrating an assembly step prior to the assembly steps pictured in FIG. 11 wherein a counter bore screw hole is used to connect the PCB assembly to the bottom housing.

FIG. 16 depicts a more detailed side planar cutaway view 1600 of FIG. 11B in accordance with the present embodiment where the elastomeric connector 124 connects the PCB assembly 126 to the motor. The elastomeric connector 124 provides extra resilience for the PCB assembly 126 connection to the motor while a counter sunk screw 1602 is used for base attachment and also provides increased stability for improved shock absorption capability and compression for maintaining positioning of the elastomeric connector 124. Referring to FIG. 17, a front bottom right perspective view 1700 of a bottom of the HDD housing illustrates a counter bore screw hole 1702 provided in the housing base 122 for the attachment screw 1602 which allows for the PCB assembly 126 to be mounted higher and gives extra thickness to the base 122 for increased base stiffness.

Thus, a low profile motor has been shown and described which provides increased resiliency and shock absorption capability. While the improvements to the motor have been described in connection with an axial field motor design, those skilled in the art will realize that these improvements can also be used to provide a low profile, more resistant to shock events, radial field motor design. An improved assembly method for such motor has also been shown with reduced part count and reduced complexity as well as self-alignment of the preload bias and ease of alignment and connectability of the motor's stator 108. Further, while the motor and assembly method have been described in connection with a low profile hard disk drive, those skilled in the art will realize that such low profile motor will have advantageous uses in other areas such as motors for cooling fans in low profile electronic devices such as computers, notebooks and pads.

While several exemplary embodiments have been presented in the foregoing detailed description of the invention, it should be appreciated that a vast number of variations exist, including variations as to the structures formed through varying manufacturing parameters or hierarchical structure shapes and sizes. It should further be appreciated that the exemplary embodiments are only examples, and are not intended to limit the scope, applicability, dimensions, or configuration of the invention in any way. Rather, the foregoing detailed description will provide, those skilled in the art with a convenient road map for implementing an exemplary embodiment of the invention, it being understood that various changes may be made in the function and arrangement of elements and method of fabrication described in an exemplary embodiment without departing from the scope of the invention as set forth in the appended claims.

What is claimed is:

1. A hard disk drive comprising:
   a spindle motor having a fluid dynamic bearing (FDB) motor hub and a stator;
   a ring-shaped magnet;
   a hard disk drive housing for housing the spindle motor and the ring-shaped magnet, the hard disk drive housing having an upper housing and a base, the base comprising a first material; and
   a base insert having ferromagnetic properties, the base insert comprising a second material and having a flat circular bottom portion with a hole and an outer circumferential vertical portion, and wherein the flat circular bottom portion of the base insert is located between the stator of the spindle motor and the base to enhance yield strength therebetween, the stator is located above the flat circular bottom portion of the base insert between the flat circular bottom portion and the magnet in a vertical direction, and a bottom portion of the spindle motor is surrounded by the outer circumferential vertical portion of the base insert to generate preload for the FDB motor hub.

2. The hard disk drive in accordance with claim 1 wherein the second material has a higher yield strength than the first material.

3. The hard disk drive in accordance with claim 1 wherein the second material is stainless steel or steel and the first material is aluminum.

4. The hard disk drive in accordance with claim 1 wherein the spindle motor is a radial motor.

5. The hard disk drive in accordance with claim 1 wherein the spindle motor is an axial field spindle motor.

6. The hard disk drive in accordance with claim 5 wherein the base insert includes a FDB sleeve integrated therewith, the FDB sleeve surrounding the FDB motor hub.

7. A hard disk drive, comprising:
a spindle motor having a fluid dynamic bearing (FDB) motor hub;
a hard disk drive housing for housing the spindle motor, the hard disk drive housing having an upper housing and a base, the base comprising a first material; and
a base insert having ferromagnetic properties, the base insert comprising a second material and having a flat circular bottom portion with a hole and an outer circumferential vertical portion, and wherein the flat circular bottom portion of the base insert is located between the spindle motor and the base to enhance yield strength therebetween and a bottom portion of the spindle motor is surrounded by the outer circumferential vertical portion of the base insert to generate preload for the FDB motor hub,
wherein the spindle motor is an axial field spindle motor, and
wherein the base insert comprises:
a non-ferromagnetic insert; and
a ferromagnetic bias ring, the ferromagnetic bias ring bonded to an outer ring surface of the non-ferromagnetic insert.

8. A hard disk drive, comprising:
a spindle motor having a fluid dynamic bearing (FDB) motor hub;
a hard disk drive housing for housing the spindle motor, the hard disk drive housing having an upper housing and a base, the base comprising a first material; and
a base insert having ferromagnetic properties, the base insert comprising a second material and having a flat circular bottom portion with a hole and an outer circumferential vertical portion, and wherein the flat circular bottom portion of the base insert is located between the spindle motor and the base to enhance yield strength therebetween and a bottom portion of the spindle motor is surrounded by the outer circumferential vertical portion of the base insert to generate preload for the FDB motor hub,
wherein the spindle motor is an axial field spindle motor, and
wherein the spindle motor comprises:
a stator having a circular hole formed in a center thereof;
a rotor comprising a top rotor assembly located above the stator and the FDB motor hub coupled to the top rotor assembly and extending through the circular hole formed in the stator, wherein the rotor further comprises a bottom rotor located below the stator; and
a permanent magnet, wherein the permanent magnet is bonded to the top rotor assembly.

9. The hard disk drive in accordance with claim 8 wherein a top surface of the permanent magnet is bonded to a bottom surface of the top rotor assembly.

10. The hard disk drive in accordance with claim 8 wherein an outer diameter side surface of the permanent magnet is bonded to a complementary underside surface of the top rotor assembly.

11. The hard disk drive in accordance with claim 8 wherein the permanent magnet is bonded to an upper portion of the top rotor assembly by an adhesive selected from at least one of a high strength adhesive, an epoxy adhesive, a quick cure adhesive and an ultraviolet-curable adhesive.

12. The hard disk drive in accordance with claim 8 wherein the stator comprises a stator tab extending from the stator and having multiple leads thereon, the stator tab used for alignment of the spindle motor during manufacture by fitting into a receiving depression coupled to the base.

13. The hard disk drive in accordance with claim 12 wherein the stator has a portion which extends out from the spindle motor, the portion including the stator tab and an outer circumferential edge, and wherein a bottom surface of the outer circumferential edge and an outer edge of a bottom surface of the stator tab are bonded to adjoining top surfaces of the base to provide adhesion and environmental sealing.

14. The hard disk drive in accordance with claim 12 further comprising:
a printed circuit board (PCB) assembly for receiving and providing motor control signals; and
an elastomeric connector physically coupleable to the stator tab and the PCB assembly for electrically coupling the multiple leads on the stator tab to leads on the PCB assembly.

15. The hard disk drive in accordance with claim 14 further comprising a housing screw connecting the base through a counter bore hole formed therein to the upper housing, the counter bore hole located within the base for the housing screw to couple the PCB assembly to the base and to provide compression for the elastomeric connector.

* * * * *